(12) United States Patent
Scherzinger et al.

(10) Patent No.: US 6,398,255 B1
(45) Date of Patent: Jun. 4, 2002

(54) AIRBAG ARRANGEMENT IN VEHICLES

(75) Inventors: Walter Scherzinger, Ulm; Ralf Baar, Dornstadt, both of (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/389,248

(22) Filed: Sep. 3, 1999

(30) Foreign Application Priority Data

Sep. 8, 1998 (DE) .......................................... 198 40 998

(51) Int. Cl.⁷ .............................................. B60R 21/16
(52) U.S. Cl. ..................................... 280/731; 280/728.1
(58) Field of Search .............................. 280/728.1, 731, 280/743.1

(56) References Cited

U.S. PATENT DOCUMENTS

| | | | | |
|---|---|---|---|---|
| 5,024,464 A | * | 6/1991 | Kawaguchi et al. | 280/731 |
| 5,597,177 A | * | 1/1997 | Matsuura | 280/731 |
| 5,615,907 A | * | 4/1997 | Stanger | 280/728.2 |
| 5,931,490 A | * | 8/1999 | Shaklik | 280/728.2 |
| 6,029,992 A | * | 2/2000 | Vendely et al. | 280/728.2 |
| 6,079,737 A | * | 6/2000 | Isomura et al. | 280/731 |

FOREIGN PATENT DOCUMENTS

| | | |
|---|---|---|
| GB | 2 222 117 | 2/1990 |
| GB | 2 325 900 | 12/1998 |
| WO | 97/46424 | 12/1997 |

* cited by examiner

*Primary Examiner*—J. J. Swann
*Assistant Examiner*—L. Lum
(74) *Attorney, Agent, or Firm*—Foley & Lardner

(57) ABSTRACT

The invention relates to an airbag arrangement in vehicles, which is preferably secured at the steering wheel (11) of the vehicle and which comprises a gas generator (12) which is secured to a generator carrier (14) and which can be ignited in the event of an accident, an inflatable gas bag (13) which is at least largely tightly connected to the latter via an opening (17), which is folded together and which can be inflated by the gas from the gas generator (12), and securing means (15, 16) for the edge (18) of the gas generator (12) surrounding the opening (17) which are attached to the vehicle, in particular at the steering wheel (11). The invention consists in that the gas generator (12) is attached in a resiliently yielding manner at least in one direction, preferably in all directions at least substantially perpendicular to the central axis (19) of the gas generator (12) or the generator carrier (14) or, respectively, of the steering column independently of the securing means (15, 16) for the gas bag (13).

28 Claims, 3 Drawing Sheets

AIRBAG ARRANGEMENT IN VEHICLES

BACKGROUND

The invention relates to an airbag arrangement in vehicles which is preferably secured to the steering wheel of the vehicle as well as to an oscillation absorber for a motor vehicle steering wheel.

In motor vehicle steering wheels, oscillation absorbers are often used in order to absorb low frequency oscillations of the airbag-steering wheel/steering column system. Oscillation absorbers of this kind consist substantially of additional masses which are resiliently suspended in a separately mountable frame and which have eigen-frequencies which are matched to the steering system and a compulsorily limited deflection.

SUMMARY OF THE INVENTION

The object of the invention consists in reducing the mass required for the creation of an oscillation absorber.

For satisfying this object the invention provides that the oscillation absorber mass is formed by all or a portion of the components of an airbag arrangement with the exception of the cover.

For this, in accordance with the invention and in contrast to conventional airbag modules in which the gas generator is firmly mounted, the latter is decoupled alone or together with further module parts from the gas bag holder and cover and seated in the steering wheel in a manner such that it is capable of oscillating with a limited deflection.

A further object of the invention consists in creating an airbag arrangement of the initially named kind which is particularly suitable for the absorption of oscillations in the steering column of motor vehicles.

The basic idea of the present invention is thus to be seen in that the entire airbag arrangement or a portion of it with the exception of the cover closing it off is used as an oscillation absorber mass which is in particular capable of oscillation transverse to the steering axis. The cover only should not participate in the oscillation because the steering wheel should also be closed off from the outside in the region of the airbag arrangement by a through-going, non oscillating surface.

Whereas in principle the gas bag holder means can also be designed as a constituent of the oscillation absorber mass, it is nevertheless preferred when only the generator carrier with the components which hold it forms the oscillation absorber mass, since otherwise sufficient oscillatory spaces would have to be made available inside the steering column for the gas bag holding means, which could lead to space difficulties. If, on the other hand, only the gas generator with the parts secured to it oscillates, then the outer dimensions of the airbag arrangement and in particular the installation indentations in the steering wheel can remain unchanged with respect to non-oscillating airbag arrangements because the oscillatory space for the generator and the components secured to it can be made available inside the airbag arrangement.

In so far as only the generator carrier with the components secured to it is seated in a manner such that it is capable of oscillating, the catcher prongs can be secured either to the steering wheel or at the oscillating module part, whereas on the contrary the elastic bearings are secured at the module part and the steering wheel respectively.

To avoid an interaction of the oscillating subsystems with the non-oscillating module constituents, the latter are brought to a definite minimum distance outside the permissible deflection.

Preferred embodiments of the non-oscillating parts of the airbag module include the holder basket which serves as a collision protection in the event of a failure of the airbag.

For an ideal cooperation of oscillating and non-oscillating constituents of the airbag module, the present invention provides for tightness during the ignition of the gas generator. A particular importance is taken on here by the ring seal which effectively avoids leakage losses during the ignition of the gas generator.

In order to take up axial tangential forces which arise between the gas bag holder means and the gas generator during the ignition of the gas generator special holder means are provided which determine the maximum possible, not too great distance between the gas bag holder means and the gas generator in particular during the ignition of the gas generator.

In accordance with the present invention the gas bag holder means can also be resiliently axially movable in order e.g. to actuate a horn switch which is arranged in the steering wheel.

The most important advantages of the idea of the oscillation absorber in accordance with the invention lie in the saving in weight, because additional masses can be omitted. Through the saving in weight, a lower total mass of the steering system which must be counteracted by the oscillation absorber is also present. Substantial cost savings are thus possible through the function transfer to fewer components.

BRIEF DESCRIPTION OF THE DRAWINGS

The invention will be explained in the following in an exemplary manner with reference to the drawings; in these are shown.

DETAILED DESCRIPTION

Figure 1:
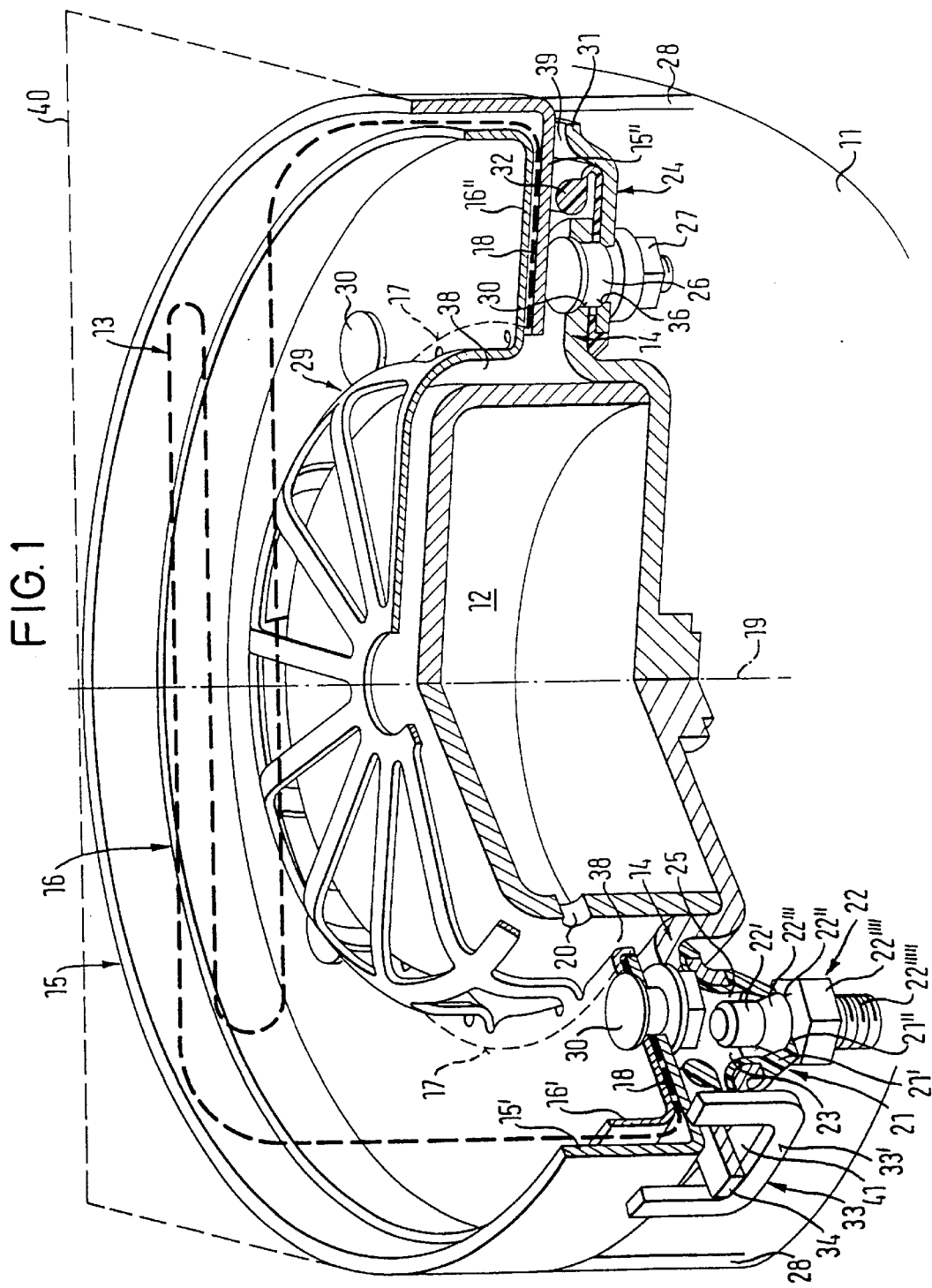
FIG. 1 a schematic, broken open perspective view of an airbag arrangement in accordance with the invention which is arranged at a vehicle steering wheel which is merely indicated, FIG. 2 a view similar to that of FIG. 1, with the steering wheel however not being indicated and only the oscillating parts of the airbag arrangement being reproduced, and FIG. 3 a perspective view similar to that of FIG. 1, with the steering wheel however not being indicated and only the non-oscillating parts of the airbag arrangement being reproduced.

In accordance with FIG. 1 a gas bag 13, which is merely indicated purely schematically in dotted lines, is provided with a central opening 17 and a clamping edge 18 surrounding the latter. The edge 18 is clamped in between an outer ring-shaped holder sheet metal lamina 15 having a circular cylindrical part 15' and an inwardly pointing planar part 15" as well as a gas bag holder ring 16 with a circular cylindrical part 16' and an inwardly pointing planar part 16". The two planar parts 15" and 16" are axially tensioned with one another through rivet connections 30 which are distributed over the periphery, with the edge 18 of the gas bag 13 being included between them.

The outer holder sheet metal lamina 15 is secured via securing elements 28 which are only schematically illustrated in FIG. 1 at a suitable part of the likewise only schematically indicated steering wheel 11 of the vehicle. The securing elements 28 are preferably axially resiliently movable so that through an axial pressing onto the non-illustrated cover of the gas bag 13, for example the horn of the vehicle can be actuated via a suitably arranged switch.

At the periphery of the outer holder sheet metal lamina 15 at least three downwardly protruding holder bows 33 are secured with a uniform distribution over the periphery, and indeed in such a manner that a radial bow opening 41 is available below the cylindrical part 15' of the holder sheet metal lamina 15 for holding purposes which are described further below.

Figure 3:
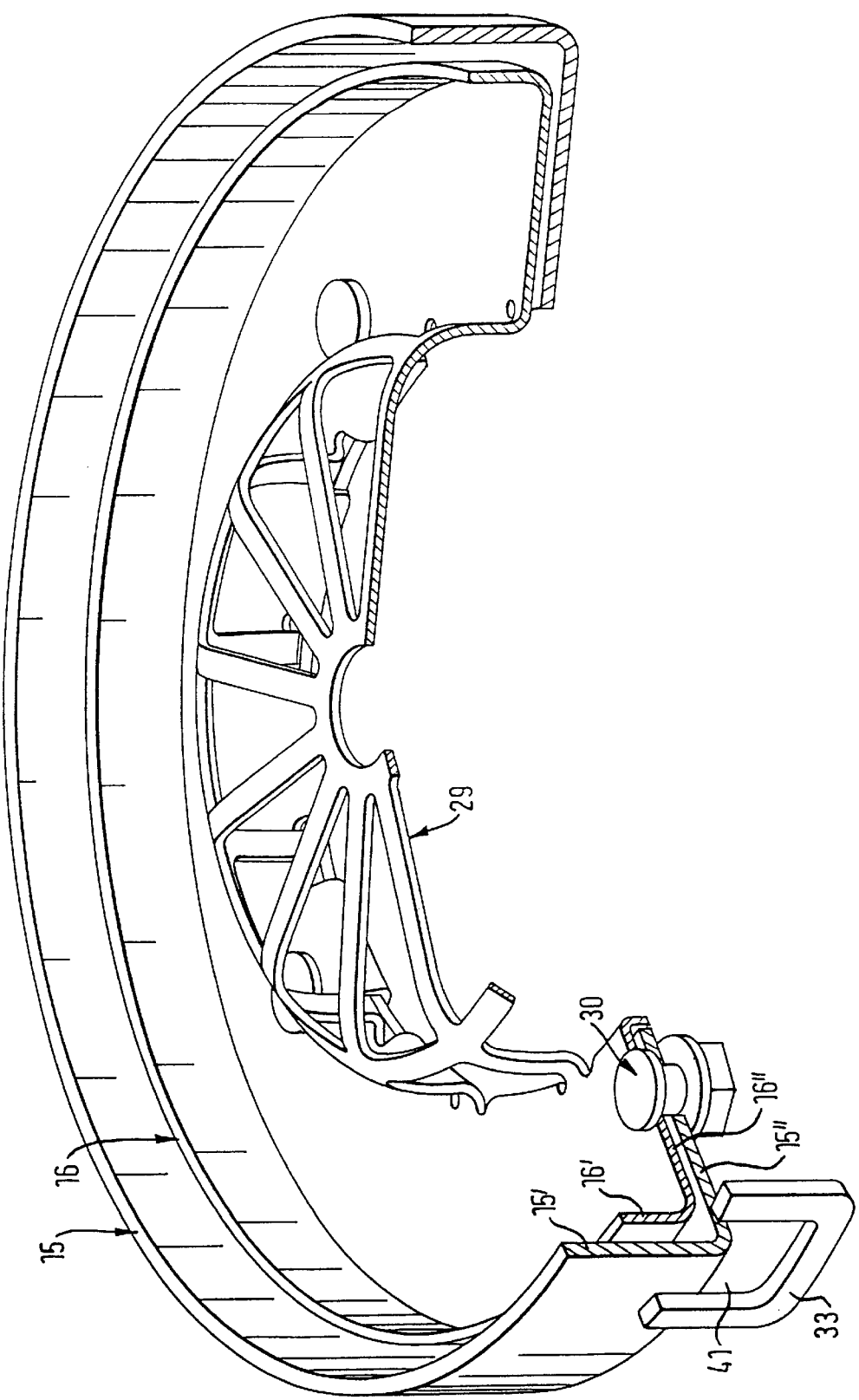

As can be seen in FIG. 3, a gas bag holder basket 29 on which the folded together gas bag 13 lies extends upwardly from the radially inner edge of the planar part 16" of the gas bag holder ring 16. The numerous apertures in the gas bag holder basket 29 are primarily for the purpose of a weight saving. In addition the gas required for the inflation of the gas bag 13 should flow in largely without hindrance through the apertures.

At the top the module consisting of the gas bag 13 as well as the holder sheet metal lamina 15 and the gas bag holder ring 16 is closed by a cover 40 which is only indicated in broken lines in FIG. 1 and which can break open or fold open during the inflation of the gas bag 13 for the release of the gas bag 13. The cover 40 is secured in any case at the steering wheel 11 and does not participate in the oscillations of any oscillation absorber masses even when the holder sheet metal lamina 15 and the gas bag holder ring 16 are intended to belong to it.

Figure 2:
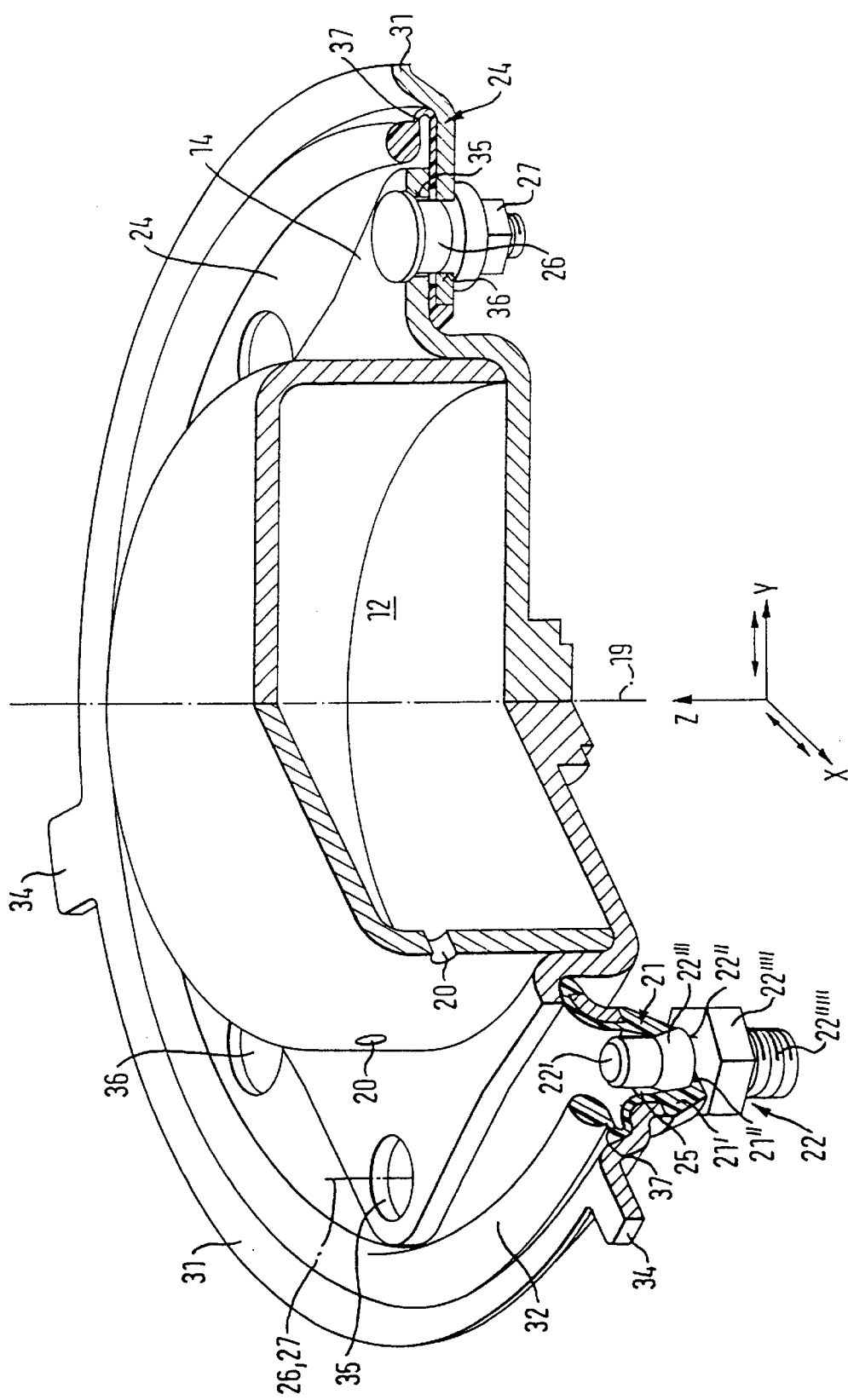

Beneath the gas bag holder basket 29 and radially inside the ring-shaped holder sheet metal lamina 15 or the gas bag holder ring 16 respectively there is located a gas generator 12 which—as can also be seen from FIG. 2—has a substantially circular cylindrical form with a central axis 19 and is provided at its periphery with a row of gas outlet openings 20 which are distributed as uniformly as possible over the periphery. The central axis 19 of the gas generator 12 should coincide with the axis of rotation of the steering wheel 11 or at least be near the latter and parallel to it.

Round about the gas generator 12 a plate-shaped generator carrier 14 is secured to the latter which in accordance with FIG. 2 is designed in the shape of a rectangle and has bores 35 at its corners. Beneath the generator carrier 14 is located an adapter ring 24 which is concentric with the central axis 19 and which preferably consists of sheet metal and has securing holes 36 which align with the bores 35 of the generator carrier 14. Bolts 26 are pushed through the bores 35 and the securing holes 36 onto which nuts 27 are screwed which serve for the securing of the generator carrier 14 at the adapter ring 24.

The adapter ring 24 is used in order to be able to connect standard gas generators to special steering wheels of a motor vehicle. Accordingly, the outer dimensions of the adapter ring 24 are matched to the vehicle in which the airbag arrangement is to be installed, the inner dimensions to the generator carrier 14.

In accordance with FIGS. 1 and 2 the adapter ring 24 has radially outwardly an upwardly pointing edge which corresponds to a plate edge and which in the assembled state in accordance with FIG. 1 lies axially at a slight distance opposite to the lower radially outward region of the planar part 15" of the outer holder sheet metal lamina 15. Through this a free lateral oscillation of the gas generator 12 is ensured. A bulge-like ring seal 32 is provided radially inwardly from the edge 31 at the adapter ring 24 which is axially braced in the assembled state both at the adapter ring 24 and at the planar part 15" of the holder sheet metal lamina 15 so that an elastic distance holder is present between the relevant components here which however permits a relative movement of the two components perpendicular to the central axis 19 without further ado.

Furthermore, the ring seal 32 is designed in such a manner that it can pivot in the presence of pressure stressing radially from inside about a ring line 37 which is indicated in FIG. 2 radially outwardly into the gap between the edge 31 and the planar part 15" of the holder sheet metal lamina 15 in order to seal off the gap between these two constructional elements.

Since in a pressure stressing by the gas generator 12 the adapter ring 24 and the gas bag holder means 15, 16 are pressed apart axially, radial holder projections 34 which are visible in FIGS. 1 and 2 reach into the radial openings 41 of the bow 33 in such a manner that the axial moving apart of the gas generator 12 and the holder means 15, 16 is limited to a value such that in particular in the region of the radially outwardly pressed ring seal 32 an unobjectionable tightness is still maintained.

In order to be able to exploit the mass of the gas generator 12 and the components 14, 24 attached to it for the oscillation absorption in accordance with the invention, bores 23 which are distributed over the periphery of the adapter ring 24 are provided at which in each case an elastic sleeve 21 which extends in the direction towards the steering wheel 11 is secured. The elastic sleeve 21 is provided below with a contraction 21' and a radially inwardly pointing ring bulge 21" which engages into a ring groove 22" which is provided at a catcher prong 22. At the ring groove 22" there adjoins upwardly a contracting conical region 22'" which merges upwardly into a cylindrical upper end region 22'. The diameter of the upper end region 22' and of the conical region 22'" is chosen in such a manner that in this region the catcher prong 22 has a significant distance on all sides from the elastic sleeve 21. A ring pocket 25 which ensures an oscillation clearance is thus present between the catcher prong 22 and the elastic sleeve 21.

Beneath the ring groove 22" is located a hexagon 22"" which is intended for the application of a tool and from which e.g. a securing pin 22""' which is provided with a thread and which is secured at a suitable location in the steering wheel 11 extends downwardly.

In the sense of a kinematic reversal the catcher prongs 22 can also be attached firmly to the adapter ring 24, and the elastic sleeves 21 which extend downwardly from the catcher prongs 22 can engage into corresponding bores of the steering wheel 11.

The mounting and the functioning of the described airbag arrangement are as follows:

The airbag module with a loosely hung in absorber module (gas generator 12 with generator carrier 14 and adapter ring 24) is introduced into the steering wheel 11 in the direction of the steering wheel axis, and indeed in such a manner that the bores 23 are oriented with the catcher prongs 22. In this the ring bulges 21" of the elastic sleeves 21 slide on the conical region 22'" of the catcher prongs 22 while downwardly widening elastically until they finally snap in radially into the ring grooves 22" of the catcher prongs 22. Then the non-oscillating part of the airbag module, consisting of the gas bag securing means 15, 16 and the parts attached thereto are secured separately to the steering wheel via the schematically indicated securing elements 28.

A removal of the airbag module is also possible without further ado, with the fastening of the gas bag securing means 15 to the steering wheel 11 first being eliminated and then the module being axially drawn off without damage from the catcher prongs 22.

After the mounting the gas generator 12 with the generator carrier 14 and the adapter ring 24 can oscillate freely in the direction perpendicular to the steering wheel axis 19 to an extent which is limited by the dimensions of the ring pockets 25. Since the gas bag 13 lies in contact on the upper side of the holder basket 29, which represents a constituent of the non-oscillating part of the airbag module, the free oscillation of the gas generator 12 is not hindered by the gas bag 13 lying on it. The preferred oscillatory directions in the x, y plane are shown in FIG. 2. In the z direction, on the other hand, no noticeable oscillation takes place.

In the event of an accident, gas flows out of the gas outlet openings 20 of the gas generator 12 into the opening 17 of the gas bag 13 and inflates the latter after a breaking open of the cover 40 (FIG. 1).

Since however a distance is present between the periphery of the gas generator 12 and the inner edge of the gas bag holder ring 16 which permits the lateral oscillatory movements of the gas generator 12, the gas can also enter from the gas outlet openings 20 through this ring gap 38 into the space between the adapter ring 24 and the gas bag holder means 15, 16. In this the gas pressure stresses the ring seals 32 which are located between these two parts and presses them radially outwardly into the contracting gap 39 between the adapter ring 24 and the planar part 15" of the outer holder sheet metal lamina 15. Through this the only non-tightness which is provided as a result of the oscillatory movability of the gas generator 12 is eliminated and it is provided for that the gas from the gas generator 12 is available at least predominantly for the inflation of the gas bag 13.

The ring seal bulge 32 thus wedges itself in the gap 39 through the outflowing gas. Since the gas bag securing means 15, 16 and the adapter ring 24 are also pressed apart by the gas pressure it is necessary to limit this movement apart in the axial direction, which takes place through abutment of the radial holder projections 34 of the adapter ring 24 which engages into the radial opening 41 of the bow 33 at the web 33' of the bow 33.

The invention thus exploits the mass of the gas generator 12 and the components 14, 24 which are secured to it as an oscillation absorber mass in a steering system, with an unobjectionable as well as a gas-loss-free inflation of the gas bag 13 being ensured in spite of the oscillatory decoupling of the gas generator 12 from the gas bag securing means 15, 16.

For the sake of clarity the oscillating parts of the described airbag module are illustrated in FIG. 2 and the non-oscillating parts of the described airbag module are illustrated separately in FIG. 3, with the gas bag 13 and the cover 40 not being indicated, in contrast to FIG. 1.

LIST OF REFERENCE NUMERALS 11 steering wheel
12 gas generator
13 gas bag
14 generator carrier
15 outer holder sheet metal lamina
15' circular cylindrical part of the outer holder sheet metal lamina
15" planar part of the outer holder sheet metal lamina
16 gas bag holder ring
16' circular cylindrical part of the gas bag holder ring
16" planar part of the gas bag holder ring
17 opening of the gas bag
18 edge of the gas bag
19 central axis of the gas generator
20 gas outlet opening
21' elastic bearing (elastic sleeve)
22 catcher prong
22' upper end
22" ring groove
22'" conical region
22"" hexagon
24"'" securing pin
23 bore
24 adapter ring
25 ring pocket
26 bolt
27 nut
28 securing element
29 gas bag holder basket
30 rivet connection
31 edge
32 movable ring seal
33 holder bow
33' web
34 holder projections
35 bore
36 securing holes
37 ring line
38 ring gap
39 gap
40 cover
41 bow opening

What is claimed is:

1. A gas bag arrangement for mounting at a steering wheel of a vehicle, the steering wheel being rotatable about an axis, comprising:

a gas bag holder containing an inflatable gas bag having an opening;

securing means for the edge of the gas bag surrounding said opening for securing said gas bag to said holder;

a cover covering said inflatable gas bag contained in said holder, said cover being adapted to give way when the gas bag inflates;

a gas generator provided on a generator carrier and ignitable to generate gas for inflation of said gas bag, said gas generator being disposed within said opening;

means for securing said gas bag holder to said steering wheel independently of said gas generator; and means for mounting said gas generator and carrier in a resiliently yielding manner for movement in directions perpendicular to the axis of said steering wheel;

wherein said means for mounting said gas generator and carrier is adapted for resiliently mounting said gas generator and carrier on said steering wheel in a manner capable of oscillation relative to said steering wheel and relative to said gas bag holder.

2. The airbag arrangement of claim 1, wherein said means for mounting said gas generator and carrier is adapted to so that a central axis of the gas generator extends parallel the axis of rotation of the steering wheel.

3. Arrangement in accordance with claim 2 wherein the gas generator is a substantially circular cylindrical structure.

4. Arrangement in accordance with claim 1, wherein the gas generator is connected via an elastic bearing to the steering wheel.

5. Arrangement in accordance with claim 4, further comprising a plurality of elastic bearings positioned with a uniform distribution over the periphery of the gas generator.

6. Arrangement in accordance with claim 5, wherein each elastic bearing comprises an elastic sleeve having an axis which extends substantially parallel to the central axis of the gas generator.

7. Arrangement in accordance with claim 6, wherein each elastic sleeve surrounds a catcher prong which is secured to the vehicle.

8. Arrangement in accordance with claim 7, wherein each elastic sleeve is secured with its upper end at the edge of a bore which is provided in the generator carrier.

9. Arrangement in accordance with claim 8, wherein the opening has a greater diameter than the end of the catcher prong so that the elastic sleeve has a significant radial distance from the end of the catcher prong so that between the catcher prong and the elastic sleeve a ring pocket is present which permits the oscillatory movement of the gas generator.

10. Arrangement in accordance with claim 9, wherein the elastic sleeve is contracted in a region and engages a ring groove of the catcher prong.

11. Arrangement in accordance with claim 10, wherein the catcher prong includes a conical region on another side of the ring groove which contracts in the direction towards the end and which serves to elastically widen the region of the elastic sleeve which lies in contact at the catcher prong during the placing of the arrangement onto the steering wheel and finally to allow the prong to snap into the ring groove.

12. Arrangement in accordance with claim 11, wherein the catcher prong includes a hexagon on the other side of the ring groove adapted to receive a tool and a securing pin positioned to be connected to the steering wheel.

13. Arrangement in accordance with claim 1 wherein the gas generator is connected to an adapter ring having a sheet metal lamina and being positioned coaxial to the gas generator with the adapter ring radially inwardly extending maximally up to the gas generator and radially outwardly protruding radially outwardly beyond the gas generator and the generator carrier.

14. Arrangement in accordance with claim 7, further comprising
an outer holder sheet metal lamina located above the gas generator, positioned coaxial with the gas generator, and a gas bag holder ring which is concentric with the gas generator and which together with the outer holder sheet metal lamina clamps in the folded gas bag, with the holder sheet metal lamina being secured independently of the gas generator via suitable securing elements to the vehicle.

15. Arrangement in accordance with claim 14, wherein the gas holder ring is firmly connected radially inwardly to a gas bag holder basket which stretches over and is positioned a distance from the gas generator.

16. Arrangement in accordance with claim 15, wherein the edge of the gas bag surrounding the central opening of the gas bag is clamped between the outer holder sheet metal lamina and the gas bag holder ring.

17. Arrangement in accordance with claim 15 wherein the holder sheet metal lamina and the gas bag holder ring are firmly tensioned axially with respect to one another through a bolt or rivet connection and are arranged to clamp the edge of the gas generator.

18. Arrangement in accordance with claim 14, wherein the outer holder sheet metal lamina and the gas bag holder ring include an angled sheet metal lamina with a radially outer circular cylindrical part and a radially inward planar part which extends perpendicular to the central axis of the steering wheel.

19. Arrangement in accordance with claim 14 wherein the gas generator is positioned a distance from the outer holder sheet metal lamina the gas bag holder ring and the holder basket thereby permitting the lateral oscillations of the gas generator.

20. Arrangement in accordance with claim 19, wherein the generator carrier has an edge at the periphery which is arranged with a slight axial distance from the holder sheet metal lamina thereby permitting oscillatory movements of the gas generator.

21. Arrangement in accordance with claim 14 further comprising a movable ring seal positioned between the adapter ring and the holder sheet metal lamina the ring seal extending around the gas generator.

22. Arrangement in accordance with claim 21 wherein the ring seal contributes to the axial distance holding of the adapter ring.

23. Arrangement in accordance with claim 21, wherein the ring seal is secured to the adapter ring.

24. Arrangement in accordance with claim 21, wherein the ring seal is arranged and designed in such a manner that it is pressed so firmly into the gap between the adapter ring and the holder sheet metal lamina during the ignition of the gas generator and the build-up of the gas pressure in the gas bag that a largely complete sealing off against the flowing out of gas is produced.

25. Arrangement in accordance with claim 7, wherein distance holder means are positioned to limit the distance between the adapter ring and the hold sheet metal lamina.

26. Arrangement in accordance with claim 25, wherein the distance holder means comprise
a plurality of protruding holder projections that are provided at the periphery of the adapter ring and distributed over the periphery, the projections protruding into holder bows which are secured at the holder sheet metal lamina so that the axial distance between the holder sheet metal lamina and the gas generator is limited.

27. Arrangement in accordance with claim 1, wherein the gas bag holder is resiliently axially movable relative to the steering wheel.

28. An oscillation absorber for a motor vehicle steering wheel connected to a steering column, the steering wheel including an airbag arrangement having a gas generator and a bag holder for holding an inflatable bag, wherein the gas generator is secured to the steering wheel in a resiliently yielding manner and independently of the gas bag holder, whereby the gas generator forms a mass oscillatable relative to the bag holder to thereby absorb low frequency oscillations of the steering wheel.

* * * * *